US006996101B2

(12) United States Patent
Coupe et al.

(10) Patent No.: US 6,996,101 B2
(45) Date of Patent: Feb. 7, 2006

(54) RE-MAPPING AND INTERLEAVING TRANSPORT PACKETS OF MULTIPLE TRANSPORT STREAMS FOR PROCESSING BY A SINGLE TRANSPORT DEMULTIPLEXOR

(75) Inventors: David Coupe, Gex (FR); Eric M. Foster, Owego, NY (US); Bryan J. Lloyd, Vestal, NY (US); Chuck H. Ngai, Endwell, NY (US)

(73) Assignee: International Business Machines Corporation, Armonk, NY (US)

(*) Notice: Subject to any disclaimer, the term of this patent is extended or adjusted under 35 U.S.C. 154(b) by 1036 days.

(21) Appl. No.: 09/726,699

(22) Filed: Nov. 29, 2000

(65) Prior Publication Data

US 2002/0064189 A1 May 30, 2002

(51) Int. Cl.
*H04L 12/56* (2006.01)

(52) U.S. Cl. ...................... 370/389; 370/466; 370/471; 370/474; 370/479; 370/487; 370/535; 370/536; 348/423.1; 348/425.1; 348/441; 711/202; 711/216; 711/221

(58) Field of Classification Search ................ 370/389, 370/392, 466, 535–538, 487, 479, 471, 474; 348/423.1, 425.1, 425.3, 426, 441, 469; 711/202, 711/203, 206, 216, 221

See application file for complete search history.

(56) References Cited

U.S. PATENT DOCUMENTS 5,459,506 A 10/1995 Bushnell ........................ 348/7
5,566,174 A 10/1996 Sato et al. .................... 370/84
5,606,369 A 2/1997 Keesman et al. ........... 348/385
5,663,962 A 9/1997 Caire et al. ................. 370/535

(Continued)

FOREIGN PATENT DOCUMENTS

EP 1032195 A2 * 8/2000

(Continued)

OTHER PUBLICATIONS

NEC Catalog on "Valuestar" Personal Computer (Oct. 2000).

*Primary Examiner*—Steven Nguyen
*Assistant Examiner*—Roberta Shand
(74) *Attorney, Agent, or Firm*—William H. Steinberg, Esq; Kevin P. Radigan, Esq.; Heslin Rothenberg Farley & Mesiti, P.C.

(57) ABSTRACT

Method, system and computer products are provided for re-mapping and interleaving transport packets of multiple transport streams for processing by a single transport demultiplexor. The re-mapping and interleaving technique ensures unique identification of transport packets associated with multiple transport streams to be multiplexed onto a transport channel for demultiplexing by a single transport demultiplexor. At least one PID re-map table is employed having re-map values indexed by n possible PID values of transport packets associated with at one transport stream of the multiple transport streams. The n possible PID values is less than or equal to the number of PID values which can be handled by the single transport demultiplexor, and is less than all possible PID values of transport packets within the multiple transport streams. The PID values of transport packets within at least one transport stream are compared with the n possible PID values of the PID re-map table, and when a match is found, the table is indexed using the matching entry and a re-map value is generated therefrom. The re-map value replaces the original PID value within the transport packet to be forwarded for interleaving.

49 Claims, 9 Drawing Sheets

U.S. PATENT DOCUMENTS

| | | | | |
|---|---|---|---|---|
| 5,790,753 | A | 8/1998 | Krishnamoorthy et al. | 395/200.33 |
| 5,801,781 | A | 9/1998 | Hiroshima et al. | 348/441 |
| 5,875,007 | A | 2/1999 | Zhung et al. | 348/845.2 |
| 5,889,949 | A | 3/1999 | Charles | 395/200.44 |
| 5,892,535 | A * | 4/1999 | Allen et al. | 725/36 |
| 5,936,968 | A | 8/1999 | Lyons | 370/503 |
| 5,969,770 | A | 10/1999 | Horton | 348/569 |
| 6,026,506 | A | 2/2000 | Anderson et al. | 714/746 |
| 6,038,232 | A | 3/2000 | Jung et al. | 370/395 |
| 6,041,056 | A | 3/2000 | Bigham et al. | 370/395 |
| 6,052,384 | A | 4/2000 | Huang et al. | 370/468 |
| 6,072,771 | A | 6/2000 | Anderson et al. | 370/216 |
| 6,078,594 | A | 6/2000 | Anderson et al. | 370/498 |
| 6,219,358 | B1 * | 4/2001 | Pinder et al. | 370/537 |
| 6,275,507 | B1 * | 8/2001 | Anderson et al. | 370/487 |
| 6,351,471 | B1 * | 2/2002 | Robinett et al. | 370/468 |
| 6,438,145 | B1 * | 8/2002 | Movshovich et al. | 370/536 |
| 2002/0035728 | A1 * | 3/2002 | Fries | 725/68 |
| 2003/0052905 | A1 * | 3/2003 | Gordon et al. | 345/700 |

FOREIGN PATENT DOCUMENTS

| | | |
|---|---|---|
| JP | 9-167441 | 6/1997 |
| JP | 9-261585 | 10/1997 |

* cited by examiner

RE-MAPPING AND INTERLEAVING TRANSPORT PACKETS OF MULTIPLE TRANSPORT STREAMS FOR PROCESSING BY A SINGLE TRANSPORT DEMULTIPLEXOR

TECHNICAL FIELD

The present invention relates in general to demultiplexing multiple transport streams, and more particularly, to a re-mapping technique for ensuring unique identification of transport packets associated with multiple transport streams to be multiplexed onto a transport channel for demultiplexing by a single transport demultiplexor.

BACKGROUND OF THE INVENTION

An MPEG-2 set-top-box (STB) system receives data from the outside world (i.e., broadcast programs) in the form of an MPEG-2 transport level stream. The transport stream is typically received through a transport stream interface within the set-top-box system and then parsed, demultiplexed, and routed to audio/video decoders and regions in the set-top-box system memory for further processing. The functional block within the set-top-box system that receives the transport stream data and routes selected parts of the stream to either memory, an audio decoder, or a video decoder is called a transport demultiplexor.

As more channels are added to the broadcast system, the channels may-come from different transponders. To handle multiple streams simultaneously in a set-top-box system, multiple tuners, multiple demodulators and multiple demultiplexors are conventionally needed, in addition to multiple decoders.

Thus, there is sometimes a need for a set-top-box system to be able to simultaneously receive and process selected data from multiple transport streams coming from two (or more) transponders. For example, if the application is attempting a video picture-in-picture function that involves video broadcast from two separate satellites, the set-top-box system will need to simultaneously receive video from two separate transport streams. This example can be extended to recording one program to a VCR or a hard disk drive from one transponder and viewing another program from another transponder.

Another example of simultaneous processing of two transport streams would occur during a seamless channel change to a program coming from a different transponder from a first program. If the ability to simultaneously process programs from both these transponders did not exist, there would be a perceptible period of time containing an output of frozen video and muted audio from the first program until valid data from the second program was ready to play. This would be related to the time needed by the application to switch from receiving data from one transponder and then synchronizing the output to the data from the second transponder.

With the above needs as background, the following is an overview of transport stream processing pursuant to MPEG standards.

The MPEG-2 Generic Coding of Moving Pictures and Associated Audio: Systems Recommendation H.222.0 ISO/IEC 13818-1 defines the mechanisms for combining, or multiplexing, several types of multimedia information into one program stream. This standard uses a known method of multiplexing, called packet multiplexing. With packet multiplexing, elementary streams comprising data, video, audio, etc. are interleaved one after the other into a single MPEG-2 stream.

Transport Streams (TSs) are defined for transmission networks that may suffer from occasional transmission errors. The Packetized Elementary Streams (PESs) are further packetized into shorter TS packets of fixed length, e.g., 188 bytes. A major distinction between TS and PES is that the TS can carry several programs. Each TS packet consists of a TS Header, followed optionally by ancillary data called Adaption Field, followed typically by some or all the data from one PES packet. The TS Header consists of a sync byte (0x47), flags, indicators, Packet Identifier (PID), and other information for error detection, timing, etc. According to the MPEG-2 standard, the semantics for the TS include the following:

Sync_byte: (8-bits) a fixed value 0x47;

Transport_error_indicator: (1 bit) for indicating that an uncorrectable bit error exists in the current TS packet;

Payload_unit_start_indicator: (1 bit) for indicating the presence of a new PES packet or a new TS-PSI (program specific information) Section;

Transport_priority: (1-bit) for indicating a higher priority than other packets;

PID: 13-bit packets Ids including values 0 and 1 which are pre-assigned, while values 2 to 15 are reserved. Values 0x0010 to 0x1FFE, may be assigned by the Program Specific Information (PSI) and value 0x1FFF is used to identify MPEG-2 Null packets;

Transport_scrambling_control: (2-bits) for indicating the scrambling mode of the packet payload;

Adaption field control: (2-bits) for indicating the presence of an optional adaptation field prior to the payload;

Continuity_counter: which is a counter provided per PID (e.g., 4-bits) that increments with each non-repeated TS packet having the corresponding PID.

Each MPEG-2 program stream may be characterized as a data stream (which can contain data originating from a multitude of data sources) encapsulated using MPEG-2 TS packets, with each packet containing a header field with a Packet Identifier (PID). The PID field is used by the transport demultiplexor to "tune" to a particular set of PIDs that correspond to a given program stream. Each program stream must have a set of distinct PIDs (except for PID=0x1fff for the MPEG-2 Null packet).

As an example:

Program Stream 1:<video PID=0x101, audio PID=0x102, secondary audio PID=0x107, 0x1FFF>valid.

Program Steam 2:<video PID=0x101, audio PID=0x200, private data PID=0x107, 0x1FFF>valid.

Program Stream 3:<video PID=0x102, audio PID=0x102, 0x109> invalid (audio and video programs are sharing same PID=0x102).

As an MPEG-2 transport steam multiplexes several program streams into one single transport, in order to avoid ambiguity at the receiver, it is required that all the PIDs belonging to the transport stream be distinct. Thus, given a set of program streams that need to be multiplexed into a single transport stream, all the PIDs must be distinct (except for the Null packet which can be present in any program stream). In the above example, the PID=0x101 is used (for video programs 1 and 2) is not allowed since it will lead to a conflict error. Therefore, in the example, one of the programs has to re-assign a new PID value to all packets containing PID=0x101 in order to remove the conflict. It is necessary to provide, in a multiplexing technique, a mechanism for eliminating the PID conflict.

One way to solve this problem is a static technique implemented at program stream creation time, which requires the encoder to ensure distinction for all the PIDs for all the program to be multiplexed into a single transport stream. This requires the content provider to encode all material (e.g., movies, documentaries, sports events, news, etc.) with full knowledge of the playing sequence, to avoid PID conflict among the sources.

Another possibility for eliminating the PID conflict is to search all the PIDs for all the program streams that are being multiplexed. If a PID value appears in more than one program stream, then a new value is chosen that is not being used by any of the program streams. However, this process is time consuming and non-efficient because for each PID it is necessary to check all others to see if it is used by another program, the process has to be repeated for all the PIDs for all the programs.

Using the above techniques, a broadcaster is able to ensure that there are no PID conflicts in a given transport stream when it is broadcast. However, as previously mentioned, it is of increasing interest to simultaneously receive multiple transport streams at a set-top-box in order to allow enhanced services. This can be accomplished with multiple, independent transport demultiplexors. Alternatively, the multiple transport streams can be multiplexed into a combined transport stream that is sent to a single transport demultiplexor. However, in providing this multiplexing function at the set-top-box, all of the challenges faced by the broadcaster in preventing PID conflicts are again present.

It would be highly desirable to provide an efficient PID re-mapping mechanism for eliminating the PID conflict in a multiplexed transport system, and moreover, one that is implemented in hardware so the PID re-mapping can be done in real-time.

SUMMARY OF THE INVENTION

Still another possibility for eliminating the PID conflict is described in a co-pending, commonly-assigned patent application entitled “METHOD AND APPARATUS FOR MPEG-2 PROGRAM ID RE-MAPPING FOR MULTIPLEXING SEVERAL PROGRAMS INTO A SINGLE TRANSPORT STREAM,” which is assigned U.S. Ser. No. 09/447,632, filed Nov. 23, 1999, and which is hereby incorporated herein by reference in its entirety. This incorporated application describes a system which includes a mechanism to assign new PID values in such a way that it ensures that all PIDs are unique for the multiplexed transport stream. A PC accesses a file server for a transport multiplexed broadcasting system. Because the incorporated system is based on a PC, the system makes extensive use of memory by creating a mapping table of all possible PID values (e.g., 13 bits implies 8,192 entries). In each table is an address pointer to another memory region that contains the available PIDs to be used for mapping. The stream number determines which of the available PIDs is selected for mapping. Although a successful approach, the incorporated system requires significant memory and covers all possible PID combinations. Therefore, further enhancements to multiplexing multiple transport streams are believed desirable.

Briefly summarized, the present invention comprises in one aspect a method for re-mapping packet identifier (PID) values provided in transport packets associated with multiple transport streams to be multiplexed for processing by a single transport demultiplexor. The method includes: providing at least one PID re-map table having re-map values indexed by n possible PID values of transport packets associated with at least one transport stream of the multiple transport streams, wherein n is less than all possible PID values of transport packets within the multiple transport streams; and comparing PID values of transport packets associated with the at least one transport stream with the n possible PID values of the at least one PID re-map table, and when a match is found, indexing the PID re-map table using the matching PID value, generating therefrom a re-map value, and replacing the matching PID value by the re-map value.

In another aspect, a method for processing transport packets associated with multiple transport streams is provided which includes: re-mapping packet identifier (PID) values provided in transport packets associated with at least one transport stream of the multiple transport streams, the re-mapping including providing at least one PID re-map table having re-map values indexed by n possible PID values of transport packets associated with at least one transport stream of the multiple transport streams, wherein n is less than all possible PID values of transport packets within the multiple transport streams, and comparing PID values of transport packets associated with the at least one transport stream with the n possible PID values of the PID re-map table, and when a matches if found, indexing the PID re-map table using the matching PID value, generating therefrom a re-map table, and replacing the matching PID value by the re-map table. The method further includes: interleaving selected transport packets of the multiple transport streams; forwarding the interleaved transport packets of the multiple transport streams to a single transport demultiplexor; and demultiplexing the interleaved transport packets of the multiple transport streams employing the single transport demultiplexor.

Systems and computer program products corresponding to the above-summarized methods are also described and claimed herein.

To restate, the present invention allows two or more transport streams to be simultaneously processed so that streams may be partially fed into a single transport demultiplexor. The single transport demultiplexor may comprise any conventional transport demultiplexor. Further, no restrictions are placed on the existence of overlapping packet identifiers in the received transport streams. The present invention can be implemented separately from the transport demultiplexing device and allows expansion of a set-top-box function with minimal redesign. Further, the invention allows storing of one program from one live input, while viewing a second live input, again using a single transport demultiplexor. As another example, the invention allows viewing a scaled version of one program while watching another program in full screen mode (i.e., picture-in-picture). Advantageously, the present invention limits the PID look-up table to a discrete number of PIDs, for example, 32 as an entry point. If the received PID is not in the list, then the packet is discarded, i.e., marked as null. Re-mapping is to a predefined set of results, for example, one implementation would be a 5 bit PID index padded with 8 leading 0’s for 13 bits total, or alternatively could comprise a programmable value that is determined at initialization time. The invention can accommodate two input streams delivered with real time clocks simultaneously. Buffering is used prior to interleaving to ensure that multiplexing is on a packet basis.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The above objects, advantages and features of the present invention will be more readily understood from the following detailed description of certain preferred embodiments of the invention, when considered in conjunction with the accompanying drawings in which:

BEST MODE FOR CARRYING OUT THE INVENTION

The enhanced re-mapping and multiplex facility of the present invention takes advantage of two considerations in set-top-box applications involving simultaneous processing of multiple transport streams. These two considerations are to be followed when simultaneously forwarding multiple transport streams into a single transport demultiplexor.

The first consideration is that for STB applications involving multiple transport streams, the total number of PIDs from both streams that need to be extracted for a given application will not exceed a predefined number n, which is the number of PIDs that can be handled by the current state of the art demultiplexor. Currently, transport demultiplexors can filter up to 32 PIDs in a stream and send them to MPEG audio or video decoders or memory. Again, the PID filter in the enhanced transport stream multiplexor reduces the number of PIDs coming into the transport demultiplexor and ensures that the number of PIDs is less than or equal to n, i.e., 32 in one example.

Second, the total bit rate of the data to be used in an application should not exceed the maximum bit rate of the single transport demultiplexor to receive the interleaved transport stream. Current state of the art transport demultiplexors can handle up to 100 Mbits/s, which is also today's upper limit for set-top-box (STB) applications. As noted above, the transport stream is typically made up of 188-byte packets with a packet identifier (PID) to each packet. The enhanced multiplex facility of the present invention filters out unwanted PIDs before the multiplexing operation. In general, the unwanted PIDs can be replaced with null packets or other packet delineation means so that the bit rate of the combined result of the multiplexed streams remains the sum of each individual stream, and must not exceed the maximum bit rate of the transport demultiplexor. However, if the re-mapping and multiplex facility also provides clock recovery functions so that there is not a need to preserve the real-time relationship of the incoming streams, the multiplexing can take advantage of the reduced amount of data for each stream and remove any delineation associated with unwanted PIDs, essentially packing the combined data stream. This is described in detail below.

Figure 1:
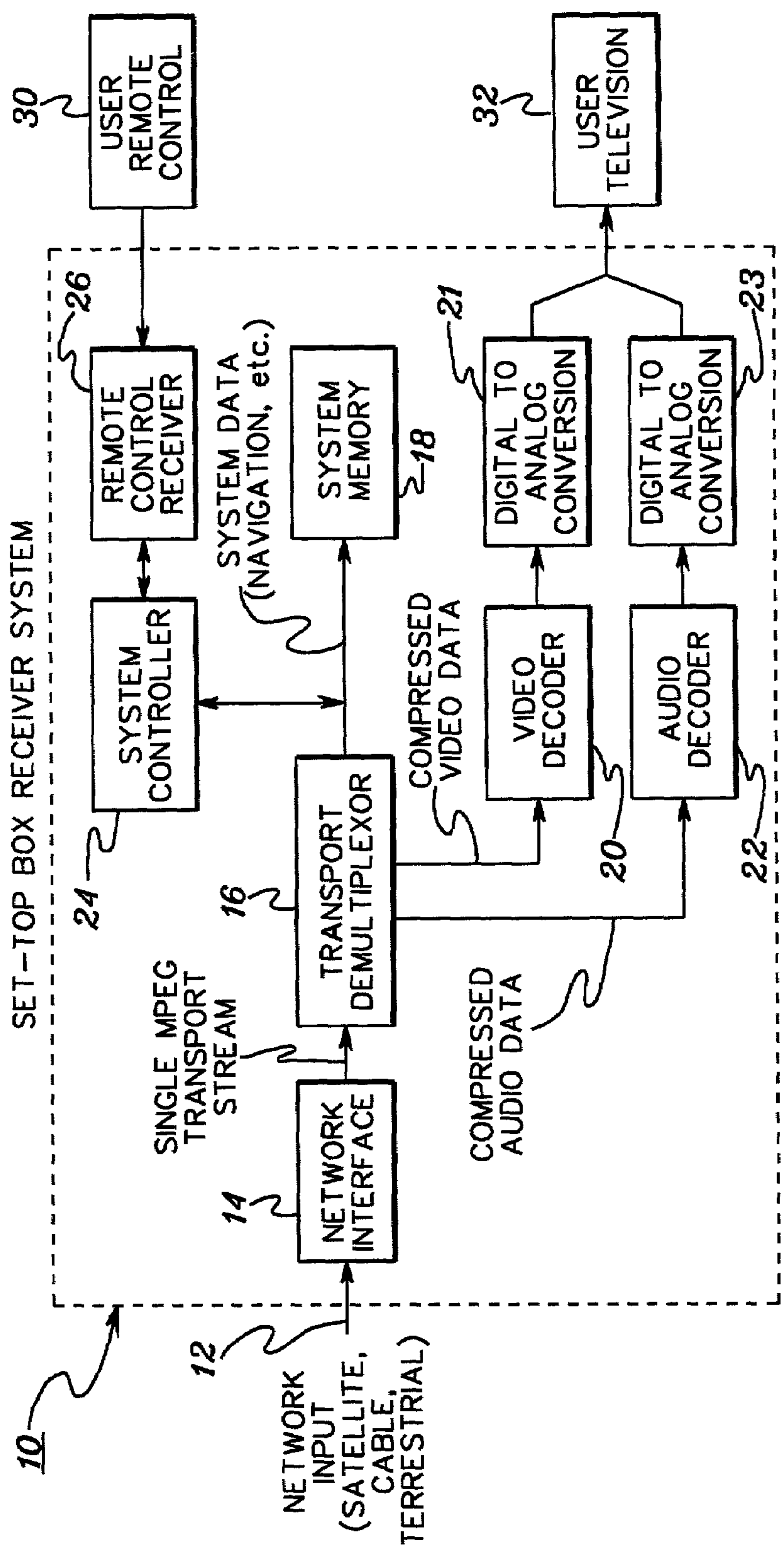
FIG. 1 is block diagram illustrating a conventional set-top-box receiver system.

FIG. 1 depicts one embodiment of a conventional set-top-box receiver system, generally denoted 10. System 10 receives a network input 12 at a network interface 14 (for example, from a satellite, cable or terrestrial connection), which converts the received signal to the desired digital data stream. In one embodiment, a single MPEG transport stream is output from network interface 14 to a transport demultiplexor 16. This single MPEG transport stream may contain one or more programs. The single transport demultiplexor 16 breaks the transport stream into its constituent pieces for a given program and provides the system data, such as navigation information, to system memory 18, the compressed video data to a video decoder 20 and the compressed audio data to an audio decoder 22. A system controller 24 receives through remote control receiver 26 a user's selection inputted through, for example, a user remote control 30. The uncompressed video and audio data is converted to analog information 21 & 23, respectively, for presentation to a user's display screen, such as television 32.

Figure 2:
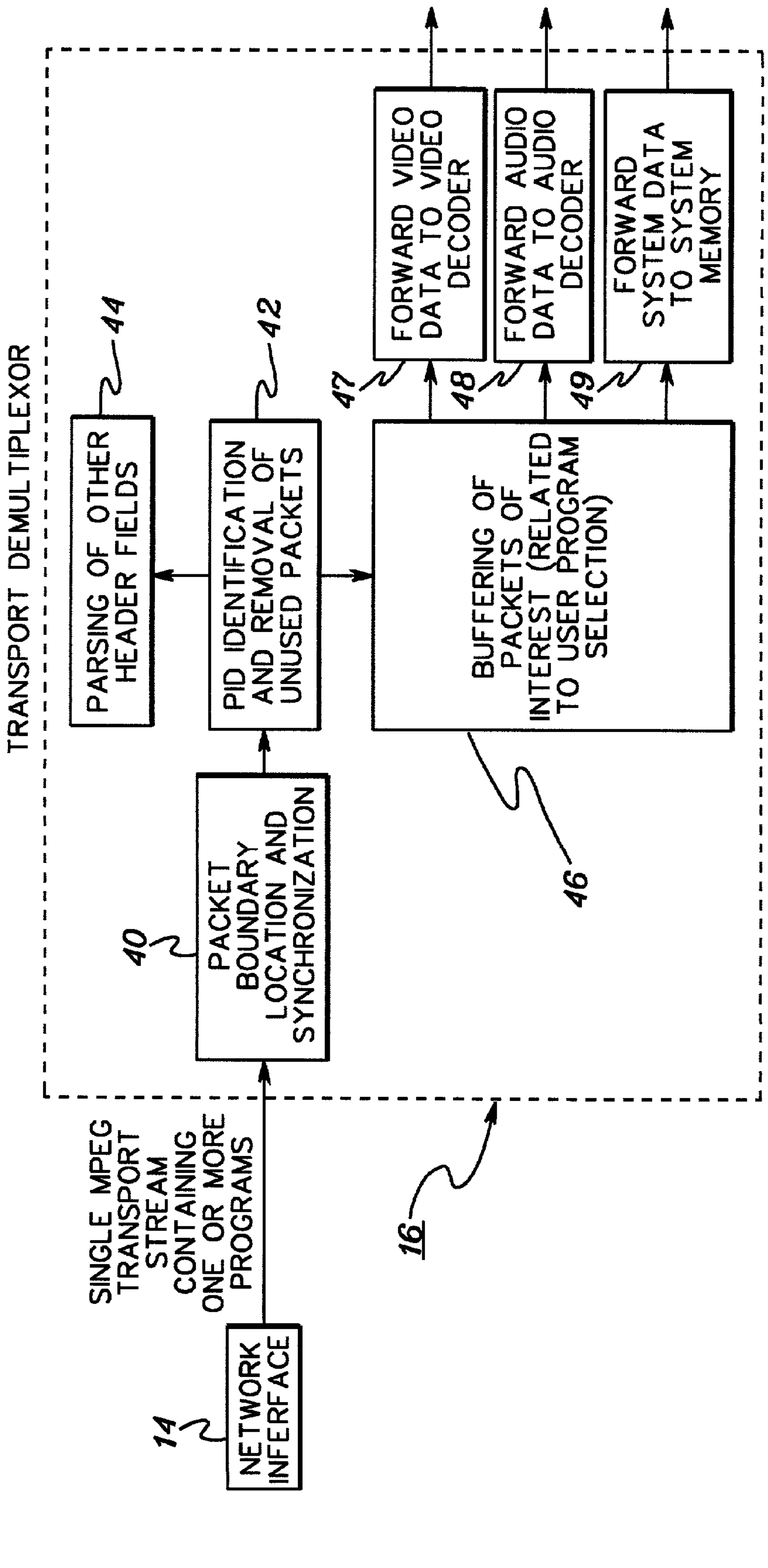
FIG. 2 is a block diagram of a conventional set-top-box transport demultiplexor.

FIG. 2 depicts one embodiment of a conventional transport demultiplexor 16. Again, a single MPEG transport stream containing one or more programs is forwarded from a network interface 14 into transport demultiplexor 16. As the transport stream is received, the demultiplexor initially performs packet boundary location and synchronization 40. Packet boundaries are commonly established by searching for two or more sync byte values of, e.g., "0x47" that are a transport packet length apart. After synchronization, the demultiplexor performs PID identification and removal of unused packets 42. This function comprises a PID filter wherein transport packets with matching PID values are forwarded, while packets with other PID values are discarded. In one embodiment, 32 PID values may be identified and forwarded, for further processing using a current transport demultiplexor. Parsing of other header fields 44 is also performed. The forwarded packets relating to the user program selected are buffered 46 to collect packets of a given PID into a continuous stream, whereby video data is then forwarded to video decoder 47, audio data is forwarded to audio decoder 48, and system data is forwarded to system memory 49.

Figure 3:
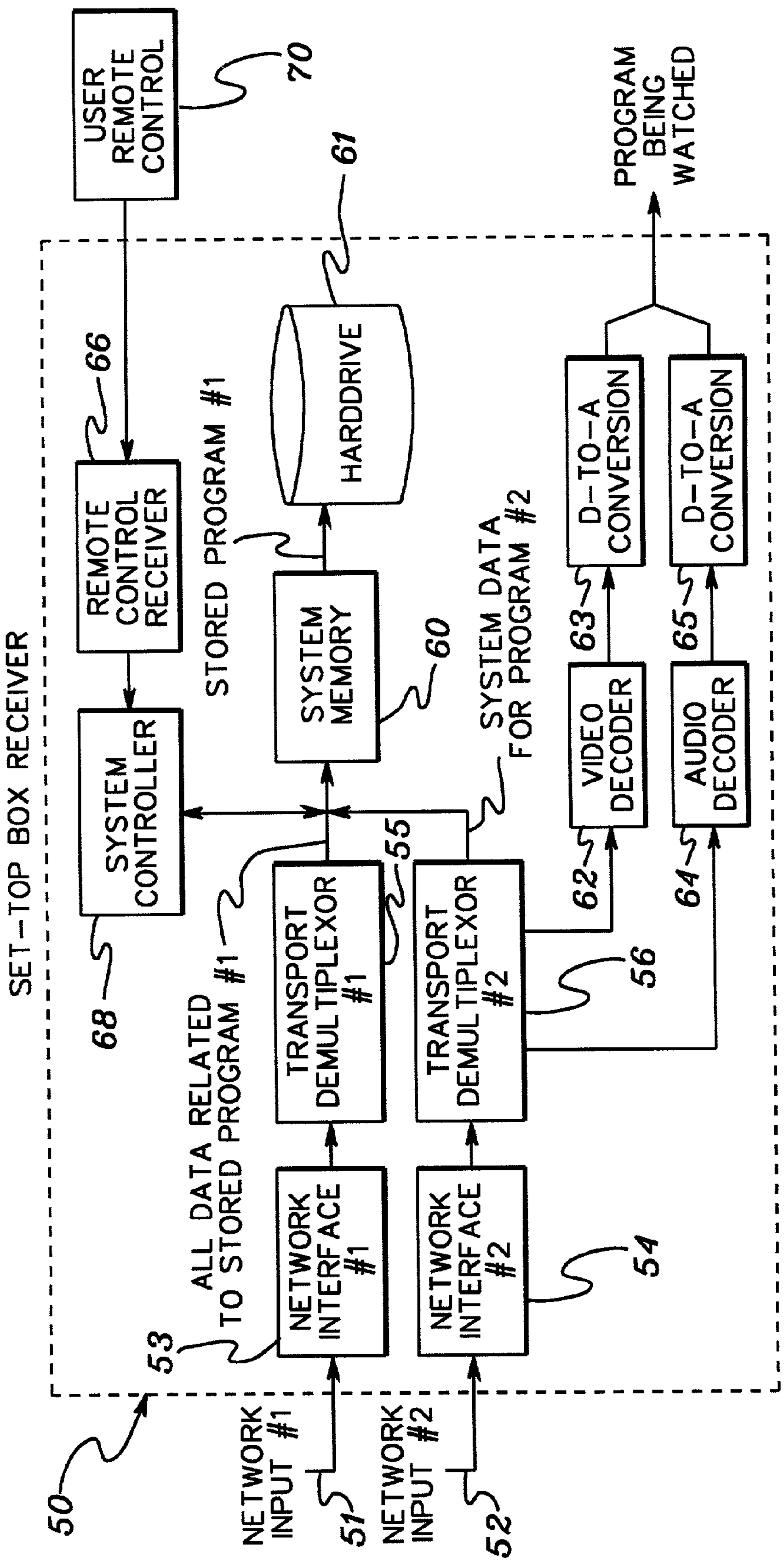
FIG. 3 is a block diagram of a set-top-box receiver having added functionality to process multiple network inputs simultaneously.

Today, simultaneously streaming data from two transponders is handled using two separate transport demultiplexors, each of which receives data from a respective transponder in the broadcast system. For example, FIG. 3 depicts one embodiment of such a set-top-box receiver 50 wherein a first network input 51 and a second network input 52 are fed through respective network interfaces 53, 54 to respective transport demultiplexors 55 & 56. Each transport demultiplexor 55, 56 essentially functions as depicted in FIG. 2. In this example, it is assumed that the first network input 51 is to be stored to memory, while a program in the second network input 52 is to be viewed by the user. With this assumption, the constituent pieces from transport demultiplexor 55 are all fed to system memory 60, for storing of program #1, for example, to hard drive 61 (which may alternately comprise any persistent storage medium). Again, in this example, all data related to program 1 would be stored. The second transport demultiplexor 56 breaks the second transport stream into its constituent packets and forwards the system data to system memory 60, the compressed video data to video decoder 62, and the compressed audio data to audio decoder 64. The system data is employed by system controller 68, which comprises a processor that also receives as input through remote control receiver 66 a user's program selection, for example, via a user remote control 70. The selected program can be displayed after digital to analog conversion of the outputted video and audio signal 63, 65, respectively.

One disadvantage with the approach of FIG. 3 is that it requires two complete transport demultiplexors and a revised system design depending upon the particular functionality desired.

Thus, an object of the present invention is to allow two transport streams to be simultaneously processed so that the streams will each be partially fed into a single transport demultiplexor. Further, an object of the invention is that a stand alone logic facility be provided separate from a standard transport demultiplexor. This allows the invention to be integrated into new designs of an integrated STB controller as a solution to the dual stream processing function, or to be a separate stand alone logic block, either in ASIC or a programmable array, e.g., attached to an existing transport demultiplexor of an STB system. Since the solution presented herein can be separate to a current transport demultiplexor design that handles a single transport stream input, the enhanced multiple transport stream multiplexor of the present invention can be added to existing STB systems without other pieces of the system requiring changes.

Note that the present invention is described hereinbelow for the simultaneous interleaving of two independent transport streams, and thus the interleaving logic is referred to as a dual transport stream (DTS) mux. However, those skilled in the art will also note that it is conceivable that more than two independent transport streams may be processed using the concepts of the present invention.

Furthermore, in the example described herein, for any application requiring two transponders, the total number of PIDs needing to be filtered and PID queues needing to be allocated in memory for practical purposes, will not exceed 32 today. A single transport demultiplexor, per MPEG-2 standards should be able to handle the filtering of 32 PIDs and 32 queues alone. Also, for practical purposes, the total bit rate of the combined transport stream after multiplexing should not exceed the maximum input rate of the transport demultiplexor which is currently 100 Mbit/s for standard devices. It can then be noted that using a standard transport demultiplexor for each transponder will be inefficient in that each standard transport demultiplexor alone, reflecting the current state of the art and MPEG-2 requirements, will have hardware to manage the interleaved 32 PIDs and 32 queues, and 100 Mbit/s input.

Figure 4:
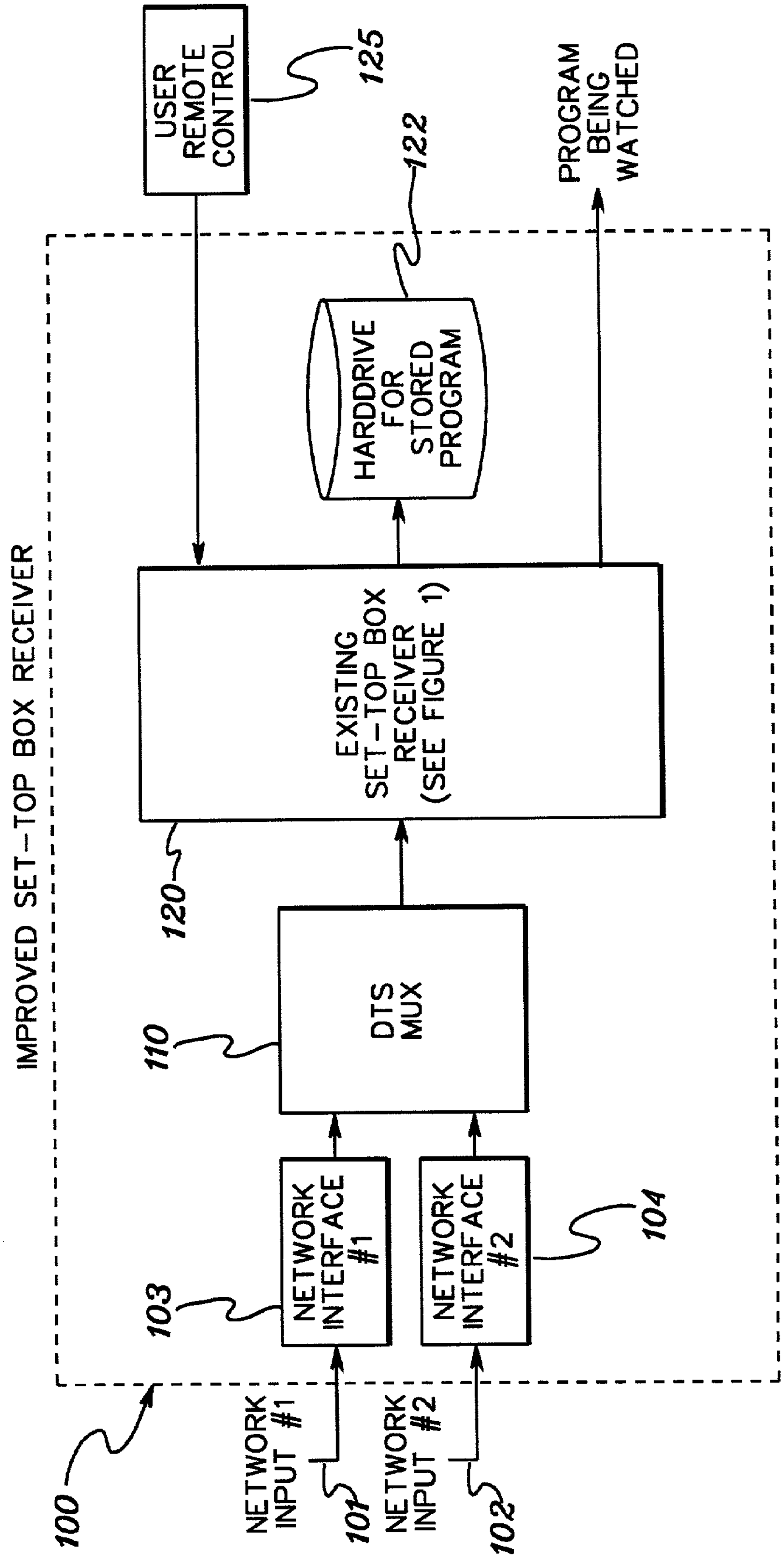
FIG. 4 is a block diagram illustrating one embodiment of an improved set-top-box receiver in accordance with the principles of the present invention.

FIG. 4 depicts one embodiment of an improved STB receiver, generally denoted 100, in accordance with the principles of the present invention. Receiver 100 receives two independent network inputs 101, 102 at separate network interfaces 103, 104, respectively. Each network interface outputs a digital transport stream that is received at a dual transport stream (DTS) multiplexor 110 implemented in accordance with the present invention. DTS multiplexor 110 creates a single transport stream by multiplexing the multiple inputs, and allows reuse of existing transport demultiplexor designs. A single stream output for multiplexor 110 is fed to an existing set-top-box receiver 120 which is essentially the same as depicted in FIG. 1, less the network interface. Set-top-box systems are described in greater detail in commonly assigned U.S. Pat. Nos. 6,026,506, 6,078,594, and 6,072,771, as well as in co-pending, commonly assigned U.S. patent application Ser. No. 08/938,248, filed Sep. 26, 1997, entitled "TRANSPORT DEMULTIPLEXOR FOR AN MPEG-2 COMPLIANT DATA STREAM," each of which is hereby incorporated by reference in its entirety.

Those skilled in the art will note that the transport demultiplexor by its basic functionality will pull apart program elements that are combined together. Therefore, a conventional transport demultiplexor will inherently separate the two interleaved transport streams into the constituent pieces. A hard drive can be provided for storing programs 122 that the user wishes to record, for example, as selected through a user remote control 125. The existing STB receiver 120 outputs the desired program that the viewer wishes to watch.

Figure 5:
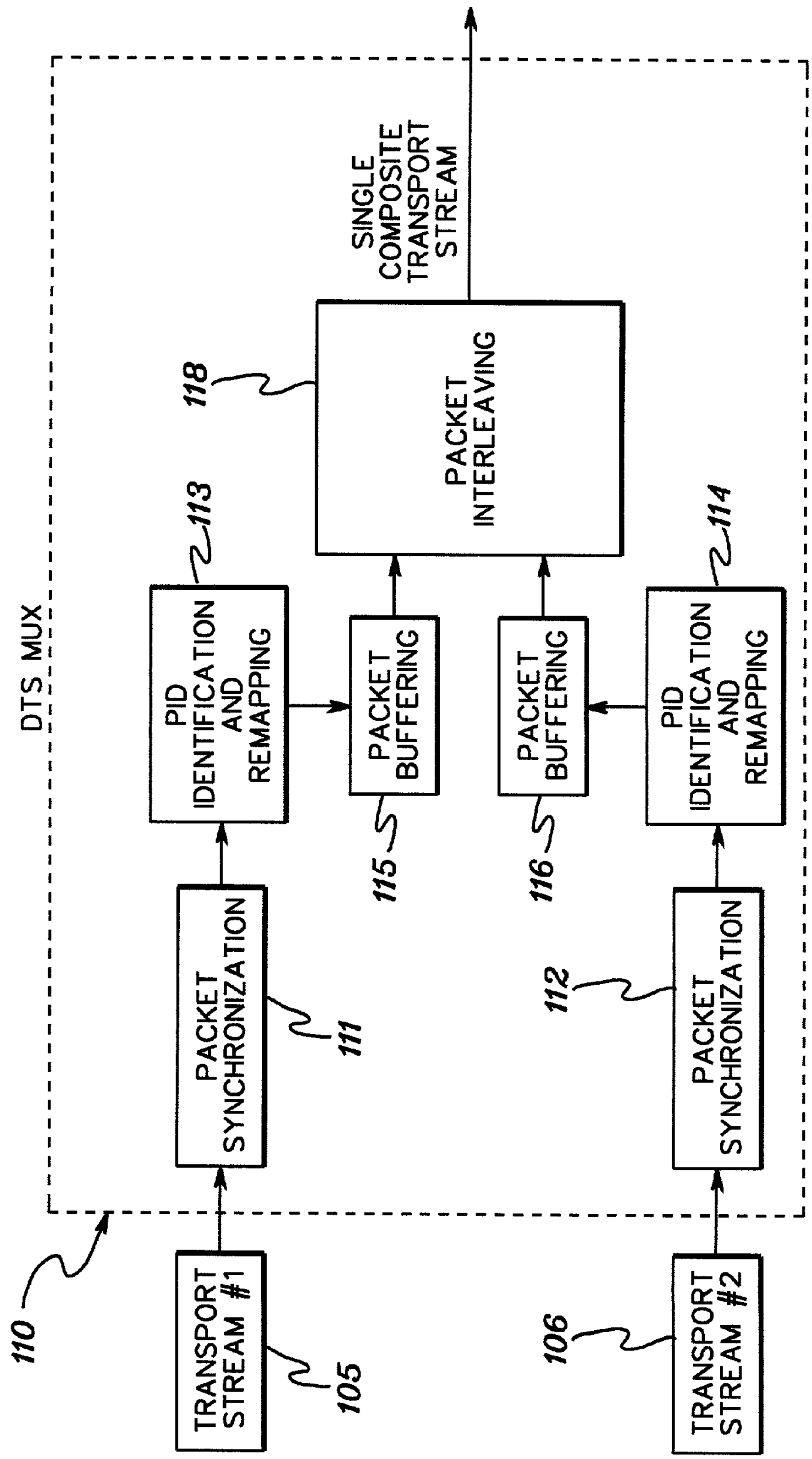
FIG. 5 is a block diagram illustrating one embodiment of a dual transport stream multiplexor system in accordance with the principles of the present invention.

FIG. 5 depicts one embodiment of a DTS mux in accordance with the principles of the present invention. DTS mux 110 receives data from two transport streams 105 & 106, arbitrarily referred to herein as the primary and secondary streams. In one embodiment, DTS mux 110 can comprise the following hardware functions:

For both streams:

Synchronization of the incoming stream to packet boundaries: packet boundaries are established on the incoming stream. The interface required to receive data would be identical to that of the transport demultiplexor. Packet boundaries are commonly established by searching for 2 or more sync byte values of 0x47 that are a transport packet length apart.

Transport packet PID filtering and PID re-mapping:

Incoming packets would be filtered based on the PID values within the header of the packet. Up to a total of 32 PIDs could be filtered from both streams. Packets matching the PID filter would be forwarded to the transport demultiplexor. All PIDs from the secondary stream needing to be reassigned, would then have a re-map value associated with them. Up to 32 re-maps would be possible, meaning the hardware would contain a bank of PID look-up entries and a corresponding bank of re-map values. Any PIDs with PID look-up entries would have the PID value within the header of the packet replaced with the re-map value before being forwarded to the transport demultiplexor.

Transport packet buffering: A packet passing the PID filter, once entirely received would be sent to the transport demultiplexor.

Continuing with FIG. 5, within DTX mux 110, the transport streams 105, 106 are initially received at respective packet synchronization logic blocks 111, 112 which identify packet boundaries. The transport packets in the different streams are fed to respective PID identification and re-mapping logic 113, 114 each of which comprises modified PID filter logic in accordance with the principles of the present invention. The basic set up of the PID filter configuration registers of the DTS mux would be controlled by software. Like the transport demultiplexor, the DTS mux would be able to filter up to 32 PIDs from a transport stream. In the discussed embodiment, this means that the DTS mux would need 32 PID filter registers (since the transport demultiplexor has only 32 queues). A 1 bit extension of the PID could be added to these 32 bit filter registers to specify which transport stream to search for a given PID entry. After PID identification and re-mapping (which is described further below with respect to FIG. 6), the selected transport packets are buffered 115, 116 and the multiple buffers are connected to a packet interleaver 118 for multiplexing and output as a single composite transport stream, e.g., on a single shared transport channel.

Figure 6:
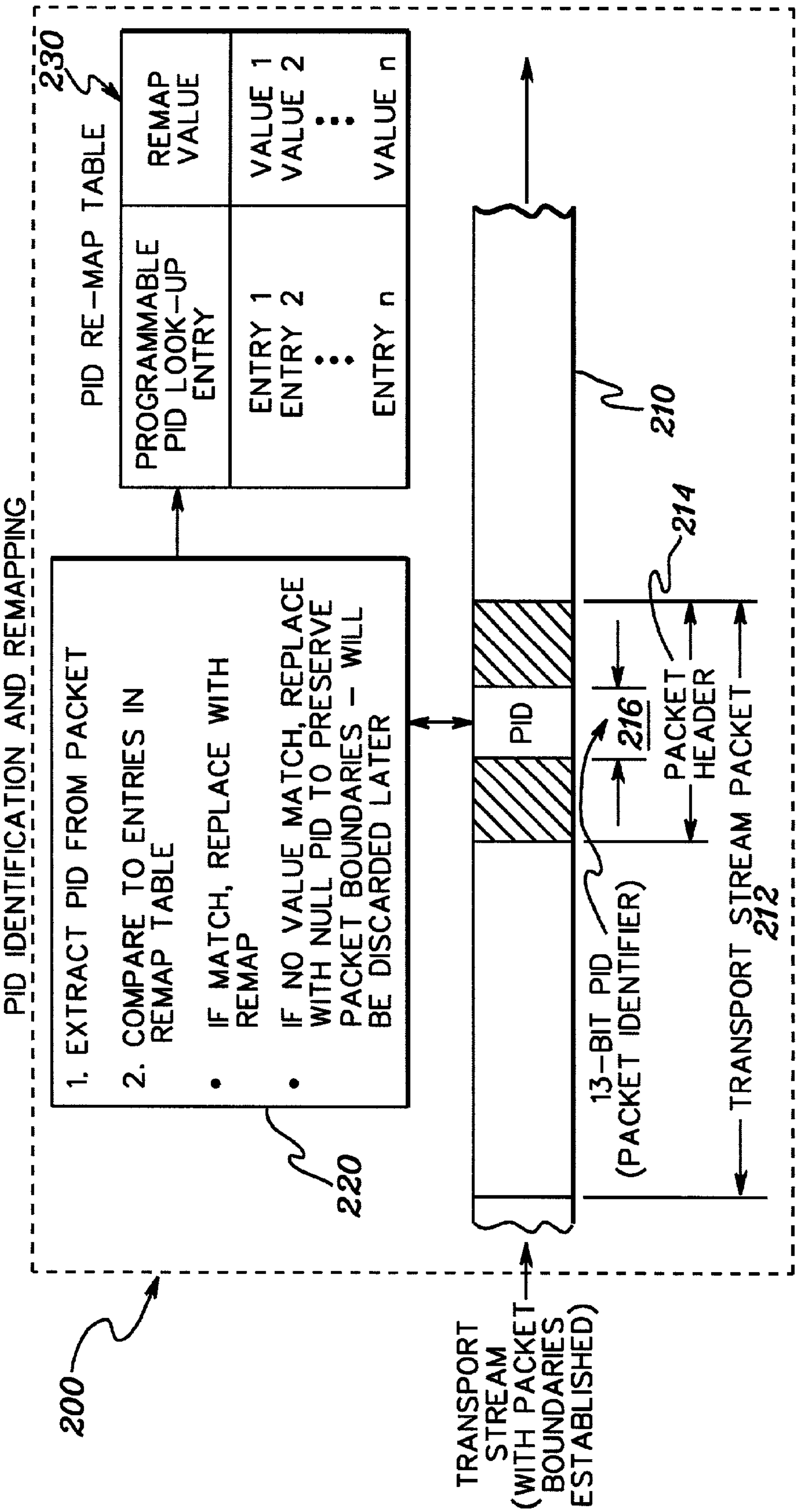
FIG. 6 is a block diagram illustrating PID identification and re-mapping in accordance with the principles of the present invention.

FIG. 6 depicts one embodiment of PID identification and re-mapping logic in accordance with one embodiment of the present invention. Logic 200 receives a transport stream with packet boundaries already established. The stream includes a transport stream packet 212, a packet header 214, and a PID 216 therein. In one embodiment, PID 216 comprises a 13-bit PID which is extracted from the packet and is to be compared to entries in a re-map table 230. In accordance with the present invention, PID re-map table 230 comprises a programmable PID look-up table having n entries, wherein in one embodiment n=32, but in either event is less than the total of all possible PID values for a 13-bit PID. The current PID value is compared with the PID look-up entries in table 230 and if a match is found is replaced by a re-map value as indexed within the table. If no match is found, then the PID can be replaced with a null PID as shown in FIG. 6. The null PID flags the packet for discarding at a later point by the transport demultiplexor. Note that any other means of delineating a packet boundary other than a null PID can also be used. The critical requirement is that the time position of a given packet leaving the DTS mux be a constant delay from the time position of when it entered the DTS mux. In general, this is accomplished by having the bit rate of the combined output transport stream equal to the sum of the initial input transport streams. Note that it is also required that this combined bit rate not exceed the maximum input rate of the transport demultiplexor. The requirement for a constant delay is dictated by the need of the transport demultiplexor to perform clock recovery using the clock references in the primary transport stream, and these references are only valid at the intended arrival rate.

Alternatively, the clock recovery function can be include in the DTS mux for the primary stream. This is not shown in FIG. 5, but would be an addition to the PID filtering function. A clock recovery unit would be based on an STC counter to be compared with extracted PCRs coming from the designed PCR PID. The PCR PID can be from either transport stream. The clock recovery unit can then output PWM control over a VCXO controlled oscillator based, e.g., at 27 Mhz that is used for clocking the STC. Given that the clock is recovered in the DTS mux directly, there is no requirement to preserve a constant delay for data passing through the function. As a result, the unwanted PIDs that are identified through the PID re-mapping do not need to be replaced with null packets or any other means of delineating packet boundaries. Only the packets of interest need to be multiplexed and there is no need to preserve packet times associated with unwanted packets so the data can be compacted. In this case, the bit rate of the combined transport stream will only be the sum of the bit rates of individual transport streams after removing unwanted packets, which will be less than that of the original transport streams. This allows the DTS mux to multiplex transport streams that have an aggregate bit rate that exceeds the maximum input rate of the transport demultiplexor as long as the combined rate of only the PIDs of interest is still less than the maximum input rate.

By way of further explanation, setup for an STB application with dual stream processing could be controlled by the set-top-box system processor. The system would extract system level information regarding one of the streams, arbitrarily referred to here as the primary stream starting with the Program Association Table (PAT) of this primary stream, located at the known PID location of 0x0000. From there a list of relevant PIDs needed from the primary stream could be kept in a table in the set-top-box system memory. Building this list of needed PIDs could be done with general table section filtering methods through the transport demultiplexor. Knowing the available PID values that are not being filtered for the primary stream, the system application could then re-map PID 0x0000 containing the PAT of the second stream to an unused value and from there, extract the needed PIDs from the tables in the secondary stream. If a desired PID value from the secondary stream matches a PID value that is being filtered from the primary stream, then the secondary PID would need to be remapped to distinguish the packet in the transport demultiplexor stages. Otherwise, the secondary PID could be filtered and sent to the transport demultiplexor unmapped. The transport demultiplexor PID filter and memory queues are then programmed to reflect all the PIDs to be extracted from both streams. The PID filter entries in the transport demultiplexor for re-mapped PIDs coming from the secondary stream would contain the re-mapped PID value.

Figure 7:
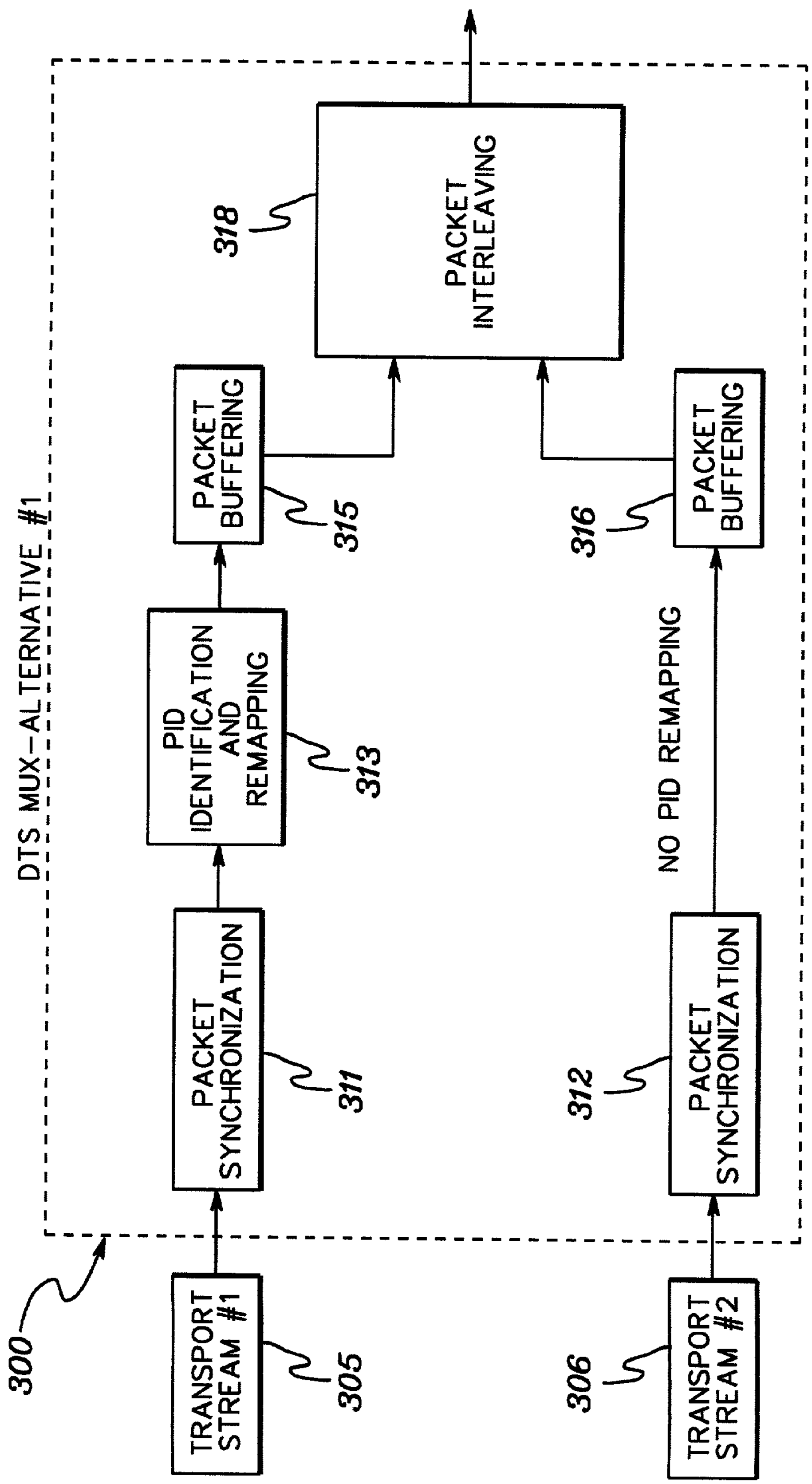
FIG. 7 is a block diagram illustrating an alternate embodiment of a dual transport stream multiplex or in accordance with the principles of the present invention.

FIG. 7 depicts one alternate DTS mux embodiment in accordance with the principles of the present invention. This DTS mux 300 again receives two independent transport streams 305, 306 which initially undergo synchronization to identify packet boundaries 311, 312. In this example, PID identification and re-mapping logic 313 is only employed with respect to the first transport stream, i.e., no PID re-mapping occurs for the second transport stream. The assumption is that the second transport stream will not change to a PID value that the first transport stream is being re-mapped to. This requirement can be imposed at initialization or can be overseen by software within the system controller, which sets the PID values based on the series of navigation tables that arrive in the transport streams. Packets are again collected in buffers 315, 316 and then interleaved 318 and output as a single interleaved transport stream.

Figure 8:
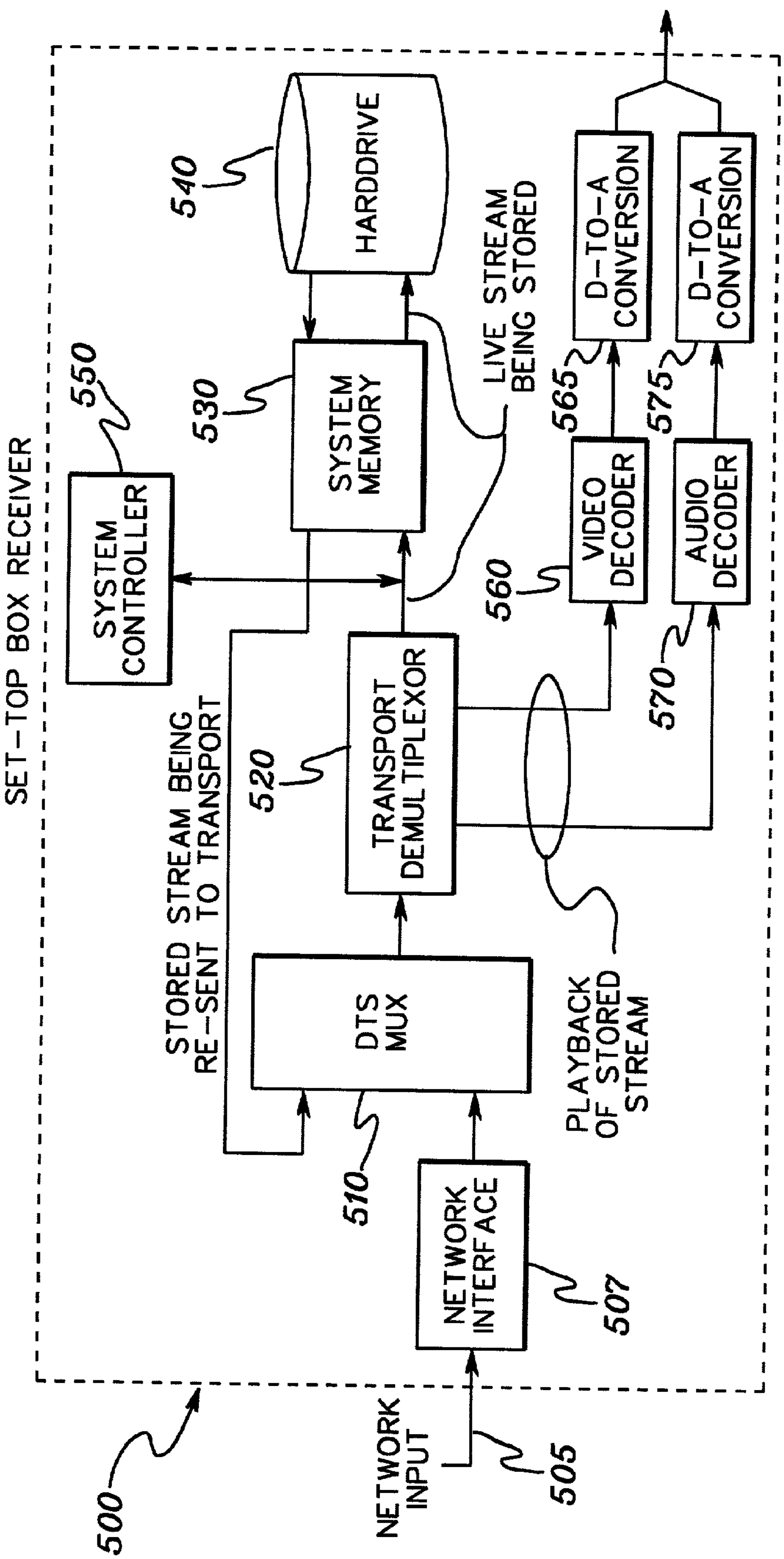
FIG. 8 is a block diagram of a set-top-box receiver in accordance with another embodiment of the present invention, wherein a stored stream is resent to the transport demultiplexor through a dual transport stream multiplexor such as depicted in FIG. 9.
Figure 9:
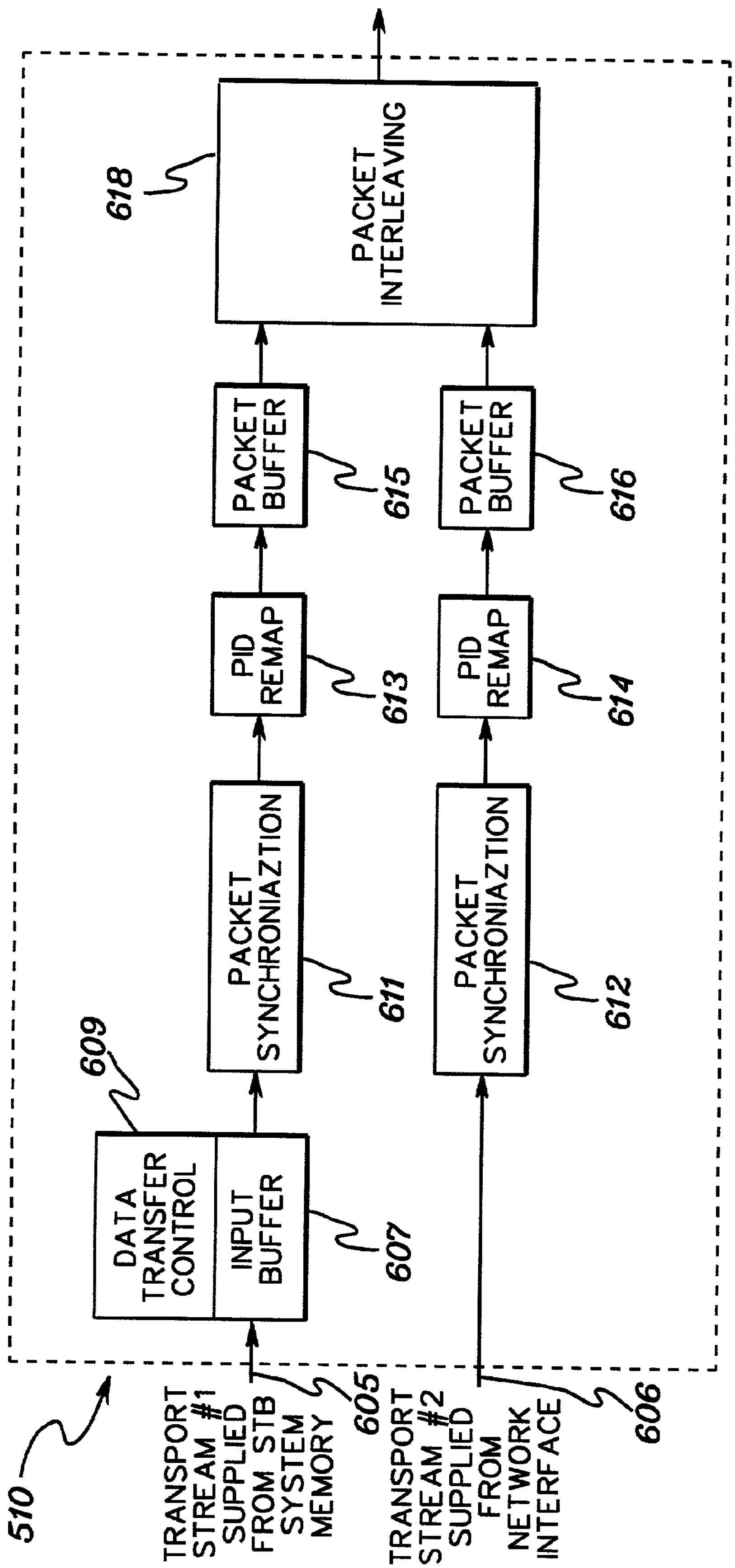
FIG. 9 is a block diagram illustrating still another embodiment of a dual transport stream multiplexor in accordance with the present invention, wherein a first transport stream is supplied from system memory and a second transport stream is supplied from a network interface.

By way of further example, FIGS. 8 & 9 depict an alternative embodiment of a set-top-box receiver and DTS mux which can be implemented in accordance with the principles of the present invention. The set-top-box receiver 500 of FIG. 8 receives a single network input 505 into a network interface 507 which outputs a single MPEG transport stream as one input to a dual transport stream (DTS) multiplexor 510 in accordance with the principles of the present invention, one embodiment of which is depicted in FIG. 9 and discussed below. Another input to DTS mux 510 comprises a stored stream that is being resent to the transport demultiplexor after retrieval through system memory 530 from persistent storage, such as a hard drive 540. As one example, the stored stream could comprise a time delayed version of the program of interest received through the network input.

The single transport demultiplexor 520 can receive the interleaved transport streams output from DTS mux 510 across a single shared transport channel. The interleaved stream can be broken down into constituent transport packets by demultiplexor 520 as described above. In this example, the live stream is assumed to be stored to hard drive 540 and therefore all data related to the desired program within the stream, including system data, video data and audio data, is stored to the hard drive. Also output from transport demultiplexor is, for example, a time delayed version of the program broken into its constituent parts, wherein system data is fed to system memory 530 for use by system controller 550, and compressed video and audio data is forwarded to a video decoder 560 and an audio decoder 570, respectively. Once uncompressed, the video and audio data is fed through respective digital to analog conversion logic 565 & 575 and merged for presentation to the user.

FIG. 9 depicts one embodiment of DTS mux 510 which can be employed with a set-top-box receiver such as depicted in FIG. 8. In this embodiment, the first transport stream 605 is assumed to be supplied from STB system memory, for example, after retrieval from persistent storage. The stream passes through an input buffer 607 under supervision of data transfer control logic 609. The output of input buffer 607 is a continuous stream that passes through packet synchronization logic 611 which identifies packet boundaries as described above. PID re-mapping is then performed 613 as described above and the re-mapped transport packets are buffered in a packet buffer 615 which is one input to packet interleaving logic 618. The second transport stream is assumed to be supplied from a network interface, such as interface 507 of FIG. 8, and is initially received into packet synchronization logic 612 to identify packet boundaries. The transport packets are then re-mapped (if necessary) 614 and buffered 616 for presentation to packet interleaving logic 618.

Those skilled in the art should note that the present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for re-mapping packet identifier (PID) values provided in transport packets associated with multiple transport streams to be multiplexed onto a single shared transport channel, said method comprising:

providing at least one PID re-map table having re-map values indexed by n possible PID values of transport packets associated with at least one transport stream of the multiple transport streams, wherein n is less than all possible PID values of transport packets within said multiple transport streams;

comparing PID values of transport packets associated with said at least one transport stream with said n possible PID values of said at least one PID re-map table, and when a match is found, indexing said at least one PID re-map table using said matching PID value, generating therefrom a re-map value, and replacing said matching PID value by said re-map value;

wherein when a non-matching PID value is found, performing at least one of: replacing said non-matching PID value with a null value, meaning that the associated transport packet is to be discarded; or performing clock recovery on the at least one transport stream and discarding the transport packet associated with said non-matching PID value; and wherein said single shared transport channel couples to a transport demultiplexor, and wherein said transport demultiplexor can handle x PID values, and $n \leqq x$, and wherein said n possible PID values equals 32 possible PID values.

2. The method of claim 1, further comprising receiving said multiple transport streams from multiple network interfaces, each network interface being coupled to receive a separate network input.

3. The method of claim 2, further comprising interleaving said multiple transport streams on a packet basis for output onto said single shared transport channel.

4. The method of claim 3, further comprising buffering selected transport packets of said multiple transport streams prior to interleaving thereof to ensure each packet is complete before interleaving.

5. The method of claim 1, wherein said multiple transport streams comprise two transport streams, and wherein said method comprises providing a separate PID re-map table for each of said two transport streams, and comparing PID values of transport packets associated with each of said two transport streams with entries of said respective PID re-map tables.

6. The method of claim 5, further comprising receiving said two transport streams for re-mapping, wherein each transport stream contains a real time clock reference.

7. The method of claim 1, wherein said multiple transport streams include navigation tables indicative of the PID values in use by the respective transport streams, and wherein said method further comprises monitoring said navigation tables and adjusting said n possible PID values of transport packets responsive to changes in said navigation tables.

8. The method of claim 1, further comprising receiving said multiple transport streams and synchronizing each stream to identify packet boundaries.

9. The method of claim 8, wherein said receiving comprises receiving at least one transport stream of the multiple transport streams through a network interface, said at least one transport stream comprising a live network input.

10. The method of claim 9, wherein at least one transport stream of said multiple transport streams comprises a transport stream retrieved from a storage device associated with a transport demultiplexor coupled to receive said interleaved transport packets.

11. A method for processing transport packets associated with multiple transport streams, said method comprising:

re-mapping packet identifier (PID) values provided in transport packets associated with at least one transport stream of the multiple transport streams, said re-mapping comprising:

providing at least one PID re-map table having re-map values indexed by n possible PID values of transport packets associated with at least one transport stream of the multiple transport streams, wherein n is less than all possible PID values of transport packets within said multiple transport streams;

comparing PID values of transport packets associated with said at least one transport stream with said n possible PID values of said at least one PID re-map table, and when a match is found, indexing said at least one PID re-map table using said matching PID value, generating therefrom a re-map value, and replacing said matching PID value by said re-map value;

wherein when a non-matching PID value is found, performing at least one of: replacing said non-matching PID value with a null value, meaning that the associated transport packet is to be discarded; or performing clock recovery on the at least one transport stream and discarding the transport packet associated with said non-matching PID value;

interleaving selected transport packets of said multiple transport streams;

forwarding said interleaved transport packets of said multiple transport streams to a single transport demultiplexor;

demultiplexing said interleaved transport packets of said multiple transport streams employing said single transport demultiplexor; and wherein said transport demultiplexor can handle x PID values, and $n \leqq x$, and wherein said n possible PID values equals 32 possible PID values.

12. The method of claim 11, wherein said interleaving comprises interleaving said multiple transport streams on a packet basis for output to said single transport demultiplexor.

13. The method of claim 12, further comprising buffering said selected transport packets prior to interleaving thereof to ensure each packet is complete before interleaving.

14. The method of claim 11, further comprising receiving said multiple transport streams and synchronizing each stream to identify packet boundaries.

15. The method of claim 14, wherein said receiving comprises receiving said multiple transport streams for multiple network interfaces, each network interface being coupled to receive a separate live network input.

16. The method of claim 14, wherein said receiving comprises receiving at least one transport stream of multiple transport streams through a network interface, said at least one transport stream comprising a live network input.

17. The method of claim 16, wherein at least one transport stream of said multiple transport streams comprises a transport stream retrieved from a storage device associated with said single transport demultiplexor.

18. The method of claim 11, wherein said method is implemented within a set-top-box system.

19. The method of claim 11, wherein said multiple transport streams include navigation tables indicative of the PID values in use by the respective transport streams, and wherein said method further comprises monitoring said navigation tables and adjusting said n possible PID values of transport packets responsive to changes in said navigation tables.

20. A system of re-mapping packet identifier (PID) values provided in transport packets associated with multiple transport streams to be multiplexed onto a single shared transport channel, said system comprising:

means for providing at least one PID re-map table having re-map values indexed by n possible PID values of transport packets associated with at least one transport stream of the multiple transport streams, wherein n is less than all possible PID values of transport packets within said multiple transport streams;

means for comparing PID values of transport packets associated with said at least one transport stream with said n possible PID values of said at least one PID re-map table, and when a match is found, for indexing said at least one PID re-map table using said matching PID value, generating therefrom a re-map value, and replacing said matching PID value by said re-map value;

wherein when a non-matching PID value is found, performing at least one of: means for replacing said non-matching PID value with a null value, meaning that the associated transport packet is to be discarded; or means for performing clock recovery on the at least one transport stream and discarding the transport packet associated with said non-matching PID value; and wherein said single shared transport channel couples to a transport demultiplexor, and wherein said transport demultiplexor can handle x PID values, and $n \leqq x$, and wherein said n possible PID values equals 32 possible PID values.

21. The system of claim 20, further comprising means for receiving said multiple transport streams from multiple network interfaces, each network interface being coupled to receive a separate network input.

22. The system of claim 21, further comprising means for interleaving said multiple transport streams on a packet basis for output onto said single shared transport channel.

23. The system of claim 22, further comprising means for buffering selected transport packets of said multiple transport streams prior to interleaving thereof to ensure each packet is complete before interleaving.

24. The system of claim 20, wherein said multiple transport streams comprise two transport streams, and wherein said system comprises means for providing a separate PID re-map table for each of said two transport streams, and for comparing PID values of transport packets associated with each of said two transport streams with entries of said respective PID re-map tables.

25. The system of claim 24, further comprising means for receiving said two transport streams for re-mapping, wherein each transport stream contains a real time clock reference.

26. The system of claim 20, wherein said multiple transport streams include navigation tables indicative of the PID values in use by the respective transport streams, and wherein said system further comprises means for monitoring said navigation tables and adjusting said n possible PID values of transport packets responsive to changes in said navigation tables.

27. The system of claim 20, further comprising means for receiving said multiple transport streams and for synchronizing each stream to identify packet boundaries.

28. The system of claim 27, wherein said means for receiving comprises means for receiving at least one transport stream of the multiple transport streams through a network interface, said at least one transport stream comprising a live network input.

29. The system of claim 28, wherein at least one transport stream of said multiple transport streams comprises a transport stream retrieved from a storage device associated with a transport demultiplexor coupled to receive said interleaved transport packets.

30. A system for processing transport packets associated with multiple transport streams, said system comprising:

means for re-mapping packet identifier (PID) values provided in transport packets associated with at least one transport stream of the multiple transport streams, said means for re-mapping comprising:

means for providing at least one PID re-map table having re-map values indexed by n possible PID values of transport packets associated with at least one transport stream of the multiple transport streams, wherein n is less than all possible PID values of transport packets within said multiple transport streams;

means for comparing PID values of transport packets associated with said at least one transport stream with said n possible PID values of said at least one PID re-map table, and when a match is found, for indexing said at least one PID re-map table using said matching PID value, generating therefrom a re-map value, and replacing said matching PID value by said re-map value;

means for interleaving selected transport packets of said multiple transport streams;

means for forwarding said interleaved transport packets of said multiple transport streams to a single transport demultiplexor;

wherein said transport demultiplexor comprises means for demultiplexing said interleaved transport packets of said multiple transport streams; and wherein said transport demultiplexor can handle x PID values, and $n \leqq =x$, and wherein said n possible PID values equals 32 possible PID values.

31. At least one program storage device readable by a machine, tangibly embodying at least one program of instructions executable by the machine to perform a method for re-mapping packet identifier (PID) values provided in transport packets associated with multiple transport streams to be multiplexed onto a single shared transport channel, said method comprising:

providing at least one PID re-map table having re-map values indexed by n possible PID values of transport packets associated with at least one transport stream of the multiple transport streams, wherein n is less than all possible PID values of transport packets within said multiple transport streams;

comparing PID values of transport packets associated with said at least one transport stream with said n possible PID values of said at least one PID re-map table, and when a match is found, indexing said at least one PID re-map table using said matching PID value, generating therefrom a re-map value, and replacing said matching PID value by said re-map value;

wherein when a non-matching PID value is found, performing at least one of: replacing said non-matching PID value with a null value, meaning that the associated transport packet is to be discarded; or performing clock recovery on the at least one transport stream and discarding the transport packet associated with said non-matching PID value; and wherein said single shared transport channel couples to a transport demultiplexor, and wherein said transport demultiplexor can handle x PID values, and $n \leqq x$, and wherein said n possible PID values equals 32 possible PID values.

32. The at least one program storage device of claim 31, further comprising receiving said multiple transport streams from multiple network interfaces, each network interface being coupled to receive a separate network input.

33. The at least one program storage device of claim 32, further comprising interleaving said multiple transport streams on a packet basis for output onto said single shared transport channel.

34. The at least one program storage device of claim 33, further comprising buffering selected transport packets of said multiple transport streams prior to interleaving thereof to ensure each packet is complete before interleaving.

35. The at least one program storage device of claim 31, wherein said multiple transport streams comprise two transport streams, and wherein said method comprises providing a separate PID re-map table for each of said two transport streams, and comparing PID values of transport packets associated with each of said two transport streams with entries of said respective PID re-map tables.

36. The at least one program storage device of claim 35, further comprising receiving said two transport streams for re-mapping, wherein each transport stream contains a real time clock reference.

37. The at least one program storage device of claim 31, wherein said multiple transport streams include navigation tables indicative of the PID values in use by the respective transport streams, and wherein said method further comprises monitoring said navigation tables and adjusting said n possible PID values of transport packets responsive to changes in said navigation tables.

38. The at least one program storage device of claim 31, further comprising receiving said multiple transport streams and synchronizing each stream to identify packet boundaries.

39. The at least one program storage device of claim 31, wherein said receiving comprises receiving at least one transport stream of the multiple transport streams through a network interface, said at least one transport stream comprising a live network input.

40. The at least one program storage device of claim 39, wherein at least one transport stream of said multiple transport streams comprises a transport stream retrieved from a storage device associated with a transport demultiplexor coupled to receive said interleaved transport packets.

41. At least one program storage device readable by a machine tangibly embodying at least one program of instructions executable by the machine to perform a method of processing transport packets associated with multiple transport streams, said method comprising:

re-mapping packet identifier (PID) values provided in transport packets associated with at least one transport stream of the multiple transport streams, said re-mapping comprising:

providing at least one PID re-map table having re-map values indexed by n possible PID values of transport packets associated with at least one transport stream of the multiple transport streams, wherein n is less than all possible PID values of transport packets within said multiple transport streams;

comparing PID values of transport packets associated with said at least one transport stream with said n possible PID values of said at least one PID re-map table, and when a match is found, indexing said at least one PID re-map table using said matching PID value, generating therefrom a re-map value, and replacing said matching PID value by said re-map value;

wherein when a non-matching PID value is found, performing at least one of: replacing said non-matching PID value with a null value, meaning that the associated transport packet is to be discarded; or performing clock recovery on the at least one transport stream and discarding the transport packet associated with said non-matching PID value;

interleaving selected transport packets of said multiple transport streams;

forwarding said interleaved transport packets of said multiple transport streams to a single transport demultiplexor;

demultiplexing said interleaved transport packets of said multiple transport streams employing said single transport demultiplexor; and wherein said transport demultiplexor can handle x PID values, and n≦x, and wherein said n possible PID values equals 32 possible PID values.

42. The at least one program storage device of claim 41, wherein said interleaving comprises interleaving said multiple transport streams on a packet basis for output to said single transport demultiplexor.

43. The at least one program storage device of claim 42, further comprising buffering said selected transport packets prior to interleaving thereof to ensure each packet is complete before interleaving.

44. The at least one program storage device of claim 41, further comprising receiving said multiple transport streams and synchronizing each stream to identify packet boundaries.

45. The at least one program storage device of claim 44, wherein said receiving comprises receiving said multiple transport streams for multiple network interfaces, each network interface being coupled to receive a separate live network input.

46. The at least one program storage device of claim 44, wherein said receiving comprises receiving at least one transport stream of multiple transport streams through a network interface, said at least one transport stream comprising a live network input.

47. The at least one program storage device of claim 46, wherein at least one transport stream of said multiple transport streams comprises a transport stream retrieved from a storage device associated with said single transport demultiplexor.

48. The at least one program storage device of claim 41, wherein said method is implemented within a set-top-box system.

49. The at least one program storage device of claim 41, wherein said multiple transport streams include navigation tables indicative of the PID values in use by the respective transport streams, and wherein said method further comprises monitoring said navigation tables and adjusting said n possible PID values of transport packets responsive to changes in said navigation tables.

* * * * *

UNITED STATES PATENT AND TRADEMARK OFFICE

CERTIFICATE OF CORRECTION

PATENT NO. : 6,996,101 B2 Page 1 of 1
DATED : February 7, 2006
INVENTOR(S) : Coupe et al.

It is certified that error appears in the above-identified patent and that said Letters Patent is hereby corrected as shown below:

Column 9,
Line 45, delete "include" and insert -- included --.

Signed and Sealed this

Eleventh Day of April, 2006

JON W. DUDAS
*Director of the United States Patent and Trademark Office*